United States Patent [19]

Hutchison et al.

[11] 4,328,605
[45] May 11, 1982

[54] CORD CLAMP

[75] Inventors: V. James Hutchison, Lakewood; Wayne F. Robb, Aurora, both of Colo.

[73] Assignee: T-Plastech Company, Denver, Colo.

[21] Appl. No.: 92,994

[22] Filed: Nov. 9, 1979

[51] Int. Cl.³ .................... F16G 11/04; F16G 11/00
[52] U.S. Cl. ................... 24/115 G; 24/136 R
[58] Field of Search ............... 24/115 G, 136 R; 339/254 R

[56] References Cited

U.S. PATENT DOCUMENTS

| | | | |
|---|---|---|---|
| 1,061,809 | 5/1913 | Bocorselski | 339/254 R |
| 1,204,457 | 11/1916 | Kreft | 339/254 R |
| 1,639,278 | 8/1927 | Wharton et al. | 24/115 G |
| 2,293,719 | 8/1942 | Eby | 339/254 R |
| 2,424,444 | 7/1947 | Fox | 339/254 R |
| 2,524,649 | 10/1950 | Buhler | 24/115 G |
| 3,456,234 | 7/1969 | Lyman | 339/254 |
| 3,806,860 | 4/1974 | Flammini | 339/254 R |

FOREIGN PATENT DOCUMENTS 125030  5/1949  Sweden ............... 24/115 G

Primary Examiner—Alexander Grosz

[57] ABSTRACT

A cord clamp for binding flexible cords and the like having a sleeve and plunger which are axially movable with respect to one another. One end of each of the plunger and sleeve is provided with a shoulder to prevent separation as the pieces undergo axial movement, and a channel and rib are provided to prevent relative rotation of the plunger and sleeve. The plunger and sleeve are each provided with alignable openings in offset relation to the rib and channel assembly, and these openings move into and out of radial alignment as the plunger and sleeve are axially moved with respect to one another. A spring is provided to urge separation of the plunger and sleeve so that the openings are biased to be out of radial alignment. A cap member seals the entire structure at an end opposite the shoulder formed on the sleeve.

13 Claims, 5 Drawing Figures

U.S. Patent
May 11, 1982
4,328,605
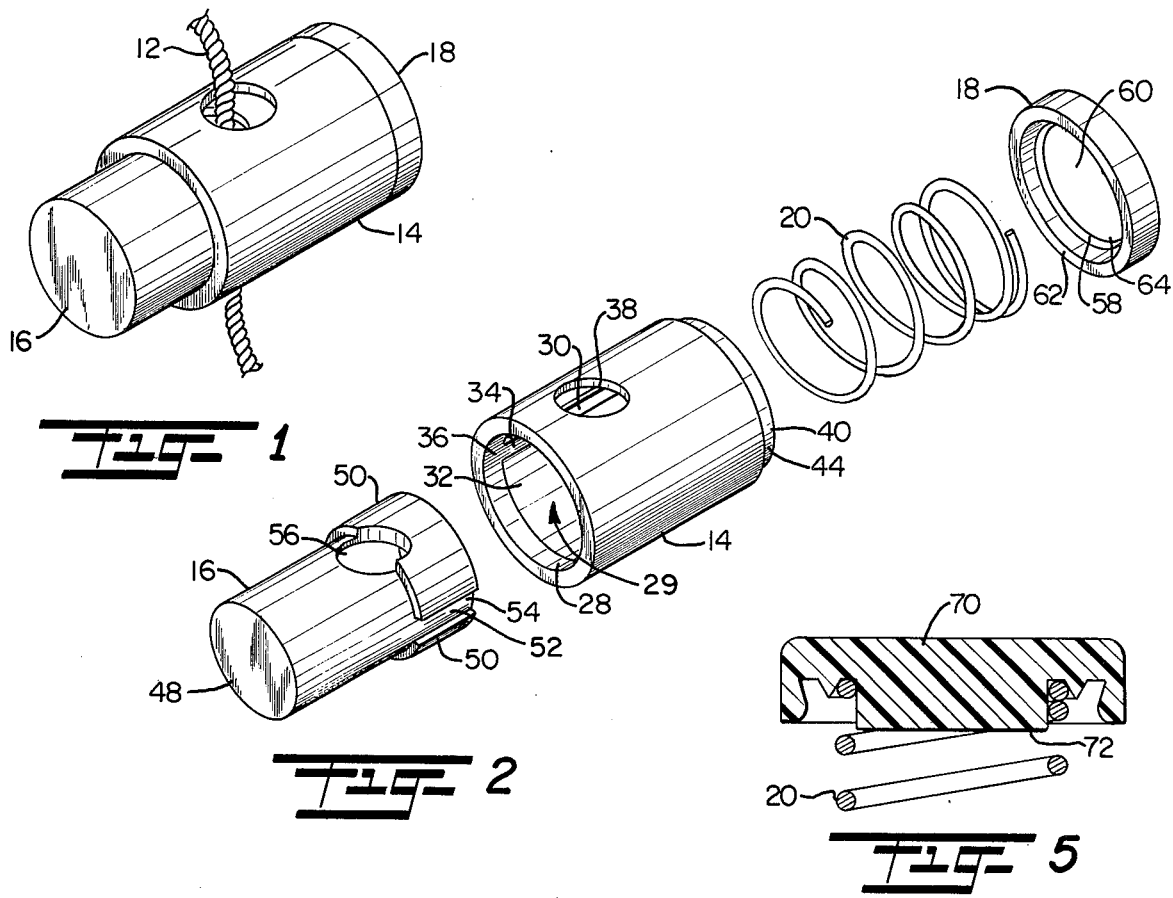
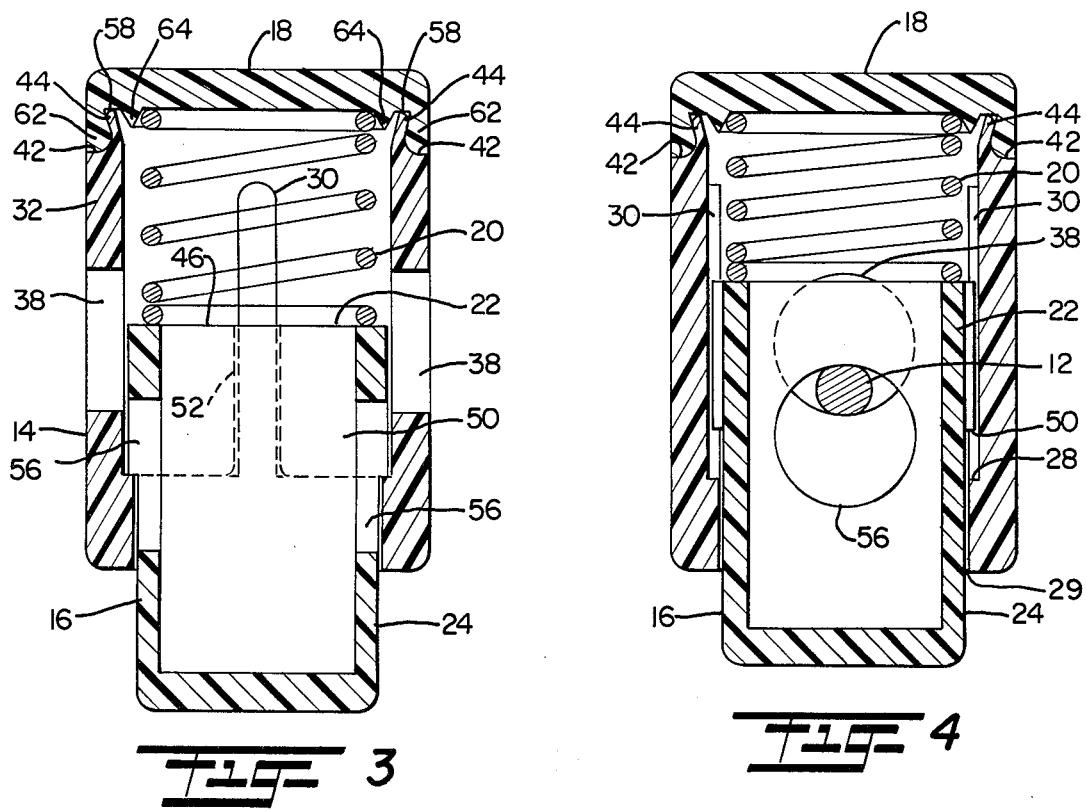

CORD CLAMP

BACKGROUND OF THE INVENTION

The present invention related to a clamp for securely retaining a flexible cord, string, rope, and the like in a fixed position with respect to the clamp. Although the present invention may be employed for various applications wherein a cord or string is to be releasably retained in a selected position, the present invention finds particular applicability for various outdoor sports including backpacking, mountaineering and the like, and is useful when used in conjunction with outerwear or any other application wherein drawstrings are employed. A particular problem which has faced those who used hooded parkas, backpacks, sleeping bags or other devices which incorporate, as part of their structure, a drawstring, is to have a single device which may readily be operated to securely bind a drawstring in a selected position; but, which may also be easily activated to release the drawstring.

A solution to this problem has been to provide a pair of cylinders each of which is enclosed on one end, with the cylinders telescoping together so that the closed ends are opposite one another. Each of the cylinders is also provided with a pair of facing holes and, as the cylinders telescope, the holes may be registered in alignment with one another. A biasing spring is positioned in the larger of the two cylinders so that, upon telescoping the cylinders together, the holes may align with one another allowing a cord to pass therethrough. Upon release, then, the cord becomes bound between the sidewalls of the telescoping pieces.

While the above-described solution to the problems of retaining a drawstring has proved functionally acceptable, it none the less has several associated problems. For example, in such a standard cord lamp, the mating cylindrical pieces may rotate with respect to one another about their common axis so that the holes in each are not in a position of common longitudinal alignment. When this happens, of course, the telescoping together of the pieces does not transversely align the holes so as to allow a cord to pass therethrough and it becomes necessary for the user to reposition the pieces rotationally with respect to one another before using the same. A second problem incumbent in such an assembly occurs when a cord positioned and clamped therein becomes severed internally of the mechanism. Since it is the cord which prevents the pieces from separating from one another, a break in the cord allows the compression spring to separate the pieces thereby "exploding" the clamp. As noted above, since these cord clamps are often used in outdoor activities, it is necessary for the user to either carry spare clamps with him during such activities or resort to more crude methods of securing the strings such as tying the drawstrings together.

The present invention is an improvement over such existing cord clamps in that it provides telescoping members which are keyed for registering their respective holes in transverse alignment while at the same time it provides structure which interlocks the members to prevent separation.

SUMMARY OF THE INVENTION

It is therefore an object of the present invention to provide a novel cord clamp that is self-contained and interlocked to prevent separation of its component members.

It is another object of the present invention to provide a cord clamp that is compact and light in weight yet which will securely retain a cord positioned therein in a releasably secured relation along a selected location of that cord.

Yet another object of the present invention is to provide a cord clamp utilizing close fitting, telescoping members having alignable transverse bores which are keyed for registration with one another.

Still another object of the present invention is to provide a sealed interlocked cord clamp which may be employed with a variety of cords and which utilizes a pair of telescoping members which are guided by smooth continuous guide surfaces at all times during their relative movement.

To accomplish these objects, the novel and improved cord clamp according to the present invention includes a pair of telescoping members which, in the preferred embodiment, comprise a cylindrical plunger which is sized for close fitting insertion in a cylindrical sleeve. A cap member seals one end of the open sleeve and a compression spring is provided to urge the plunger outwardly of the sleeve. The plunger and sleeve are interlocked by means of a pair of abutting shoulders, one of the shoulders being on each of the plunger and the sleeve so that the plunger and sleeve may not be separated from one another after assembly. The plunger and sleeve each have a pair of opposed holes which are longitudinally aligned with one another and which may be registered in transverse or radial alignment when the plunger is moved into the interior of the sleeve. A channel and rib assembly is provided on the facing sidewalls to key the sleeve and plunger against relative rotation so as to maintain the respective holes in the sleeve and in the plunger in longitudinal alignment with one another and to provide smooth guide surfaces for controlling the relative axial movement of the sleeve and plunger. After assembly, the cap is securely positioned on the open end of the sleeve thereby providing a compact, interlocked clamp assembly.

These and other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a perspective view of the cord clamp according to the preferred embodiment of the present invention;

FIG. 2 is an exploded view in perspective of the cord clamp according to the preferred embodiment of the present invention;

FIG. 3 is a cross-sectional view of the cord clamp according to the present invention, shown in an expanded position;

FIG. 4 is a cross-sectional view of the cord clamp according to the preferred embodiment of the present invention, as shown in its compressed state showing the cord clamp turned 90 degrees from the position shown in FIG. 3; and FIG. 5 is a cross-sectional view of an alternate embodiment of the end cap and spring for use with the preferred embodiment of the present invention.

DETAILED DESCRIPTION OF THE PREFERRED EMBODIMENT

The present invention relates to a novel cord clamp which is adapted to bind one or more flexible cords or strings at some desired location yet which allows quick release of that cord when so desired. The cord clamp is particularly applicable in devices utilizing draw strings since the cord clamp according to the present invention avoids the need for tying the cord while, at the same time, releasably secures the string or cord.

As shown in FIG. 1, cord clamp 10 receives a cord 12 and binds it against movement. To accomplish this binding, cord clamp 10 has a main body or sleeve 14 which receives a piston or plunger 16 with sleeve 14 and plunger 16 being relatively movable with respect to one another in an axial direction. Cord clamp 10, as broadly shown in FIG. 2, is comprised of four parts, including a cap 18 and a compression spring 20 in addition to sleeve 14 and plunger 16 discussed above.

Referring to FIGS. 2-4, it should be appreciated that sleeve 14 matingly receives plunger 16 so that plunger 16 has an interior portion 22 which is mounted internally of the sleeve 14 and an exterior portion 24 which protrudes from end 26 of sleeve 14. In the preferred embodiment sleeve 14 is substantially cylindrical, and is hollow so that it may receive plunger 16. It should be appreciated, however, that other geometrical configurations may be employed without departing from the scope of this invention, but it has been found that utilizing cylindrical members leads to ease and more economy in manufacture. to define a continuous guide surface for plunger 16. Ribs 30 extend substantially the entire length of sleeve 14 and define a close-fitting guide surface for plunger 16 as noted. Preferably, a pair of diametrically opposed bores or holes 38 are formed in a mid-portion of sidewall 32 of sleeve 14 so that holes 38 are in facing relationship to one another. Holes 38 are circumferentially offset 90 degrees from ribs 30 so that each of ribs 30 is in spaced relation to both of holes 38. Sleeve 14 has an open end 40 opposite lip 28 and opening 29. Open end 40 includes a surrounding shoulder 42 and an upstanding rim 44 with rim 44 and shoulder 42 being formed out of sidewall 32 of sleeve 14. As shown in FIGS. 3 and 4, rim 44, which extends around the circumference of open end 40, is outwardly flared so as to enable frictional attachment to cap 18 in the manner described below.

Plunger 16 is adapted to be inserted telescopically through sleeve 14 and is sized for a close fitting engagement with sleeve 14. Preferably, plunger 16 is generally a hollow cylinder having an open end 46 and a closed end 48, although plunger 16 could readily be of solid construction. A shoulder 50 has approximately the same radial thickness as does lip 28, and a pair of channels 52 are formed in the shoulder 50 which are sized for receiving ribs 30 with channels 52 extending in an axial or longitudinal direction. It should be noted that the bottom surface 54 of channels 52 form a continuous extension of the outer surface of the sidewall of plunger 16 so as to define a guide surface in cooperation with ribs 30. Therefore, it should be appreciated that the depth of channels 52 are approximately the same as the thickness or height of ribs 30.

A pair of opposed holes or bores 56 are formed in the sidewall of plunger 16 near end 46 at diametrically opposed positions with respect to one another. It should be noted that if plunger 16 is of solid construction, bores 56 should be formed as a single transverse bore diametrically extending completely through plunger 16. Preferably, bores 56 are circular and intersect shoulders 50 approximately across a diameter of each of bores 56. In addition, bores 56 are spaced from channels 52 in a degree corresponding to the spacing between ribs 30 and holes 38. In the preferred embodiment, bores 56 are circumferentially spaced 90 degrees from channels 52.

Plunger 16 and sleeve 14 are mounted together in close fitting, telescopic engagement so that they are axially movable with respect to one another. As plunger 16 is positioned in sleeve 14, channels 52 receive ribs 30 thereby both guiding plunger 16 in sleeve 14 and preventing relative rotation of sleeve 14 and plunger 16. Exterior portion 24 of plunger 16 is sized to extend through the end of sleeve 14 opposite open end 40. It should be appreciated that lip 28 defines a opening of reduced cross-section so that, as exterior portion 24 of plunger 16 is moved past lip 28, shoulder 50 abuts lip 28 in a plane normal to their common axis to prevent plunger 16 and sleeve 14 from separating from one another. Since ribs 30 and holes 38 are spaced apart a corresponding distance as are bores 56 and channels 52, bores 56 and holes 38 are aligned along lines parallel to the longitudinal axis of sleeve 14 and plunger 16. It should also be appreciated that a single rib 30 and channel 52 construction may be used since the single construction would still prevent relative rotation of sleeve 14 and plunger 16.

A coil spring 20 which has a diameter which is the same as the diameter of plunger 50 is then positioned in sleeve 14 and a cap 18 is then placed in sealing relationship to sleeve 14 so that it encloses opening 40 thereby retaining spring 20 between cap 18 and plunger 16 as is shown in FIGS. 3 and 4. As noted above, holes 38 and bores 56 are axially aligned, but, when shoulder 50 is in abutting relationship with lip 28, holes 38 and bores 56 are not in transverse or radial alignment. Spring 20 normally biases sleeve 14 and plunger 16 into this position wherein the bores and holes are not registered with one another, which state is shown in FIG. 3, but, as plunger 16 is moved toward the interior of sleeve 14 against the force of compression spring 20, holes 38 and bores 56 may be registered with one another in transverse alignment.

In operation, then, plunger 16 and sleeve 14 are telescoped together so as to register holes 38 and bores 56 in transverse or radial alignment. A cord 12 may then be passed transversely through the assembled cord clamp 10. Upon release of plunger 16, compression spring 20 urges plunger 16 and sleeve 14 apart so that cord 12 becomes clamped by the sidewalls of sleeve 14 and plunger 16 as shown in FIG. 4. Since spring 20 maintains expansive pressure on plunger 16, cord 12 becomes securely retained by clamp 10 between the sidewalls of a respective hole 38 and bore 56.

Since spring 20 is under compression between plunger 16 and cap 18, it is desirable that cap 18 be securely mounted to sleeve 14. In the preferred embodiment, cap 18 is provided with a groove or channel 58 formed on the inner surface 60 of cap 18. In the preferred embodiment, channel 58 is formed by sidewall 62 of cap 18 and an upstanding circular ridge 64. Preferably, the free end of sidewall 62 is slightly enlarged to a thickness corresponding to the width of shoulder 42. Cap 18 is then frictionally secured to sleeve 14 with channel 58 receiving rim 44 in a frictionally locked relation. As noted, rim 44 is outwardly divergent so that it will frictionally lock with sidewall 62 thereby securely mounting cap 18 and sleeve 14 to one another.

In the preferred embodiment, cap 18, sleeve 14 and plunger 16 are formed out of a plastic material, and cap 18 and sleeve 14 are ultrasonically welded to one another after assembly. While it should be appreciated that cap 18, sleeve 14 and plunger 16 may be formed of any suitable material, it is preferable to form the apparatus out of a tough engineering thermoplastic, such as ABS. If another material is so selected, it is desirable to seal sleeve 14 and cap 18 in any manner of affixation such as by epoxy or welding. Since spring 20 may exert substantial force on cap 18, it should then be appreciated that this welding or sealing will prevent cap 18 from inadvertent detachment from sleeve 14.

It should also be noted with respect to sleeve 14, plunger 16, ribs 30 and channels 52 that the cord clamp may be constructed with the positions of ribs 30 and channels 52 reversed, although this is not shown in the Figures. In other words, it would be possible within the scope of this invention, to form a pair of channels longitudinally through lip 28 and to form a pair of ribs on the external sidewall of plunger 16 and to eliminate ribs 30 and channels 52 in the preferred embodiment. Since this new set of channels and ribs, then, would be the functional equivalent of ribs 30 and channels 52 in preventing relative rotation of sleeve 14 and plunger 16, this construction is not shown in the drawings; however, it is believed that this alteration would be a simple matter to one skilled in the art after reading the disclosure of the present application.

FIG. 5 discloses an alternate embodiment of end cap 18. While including all of the features described above cap 70 shown in FIG. 5 includes a raised portion 72 centrally located thereon. Raised portion 72 has a cross-section corresponding to the inner diameter of spring 20 so that spring 20 may be frictionally mounted thereon. Cap 70 facilitates assembly of the cord clamp 10 since spring 20 may be mounted on raised portion 72 prior to assembly.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

What is claimed is:

1. A cord clamp comprising:
    a hollow sleeve having a pair of opposed holes in facing relationship to one another formed in the surrounding sidewall thereof and including an elongated longitudinal rib on the inner surface of said sidewall in angularly spaced relation to said holes, said sleeve including an inwardly projecting lip surrounding one end and defining an opening of reduced area from the cross-sectional area of said sleeve;
    a cap member enclosing the other end of said sleeve;
    a plunger member positioned in said sleeve and sized for relative axial movement through said opening, said plunger member having an outwardly projecting shoulder located on a first end portion thereof positioned internally of said sleeve and sized to abut said lip to prevent separation of said plunger and said sleeve, said shoulder having a channel extending in a longitudinal direction for receiving said rib in close-fitting engagement, said channel having a bottom surface formed as an uninterrupted continuation of the exterior sidewall surface of said plunger member, said plunger member having a bore extending transversely therethrough positioned to move into and out of alignment with said holes in a direction normal to the axis of said sleeve and plunger as said plunger member is moved axially in said sleeve between a first position wherein said bore and holes are registered in alignment and a second position wherein said bore and holes are not aligned, said rib defining a continuous guide surface for positively guiding said plunger member throughout its movement in said sleeve; and
    bias means in said sleeve for urging said sleeve and said plunger member into said second position.

2. A cord clamp according to claim 1 wherein said sleeve is cylindrical in shape and sized for close-fitting telescopic engagement with a second end portion of said plunger member positioned exteriorly of said sleeve, said second end portion terminating in a flat closed end formed in a plane normal to said plunger's longitudinal axis, said cap member having a flat exterior surface formed in a plane parallel to said flat closed end when said plunger member and sleeve are positioned in telescopic engagement.

3. A cord clamp according to claim 2 wherein said plunger member is hollow.

4. A cord clamp according to claim 2 wherein said sleeve has a pair of elongated ribs positioned longitudinally on its inner surface and spaced 180 degrees from one another, said holes being spaced 90 degrees from each said rib, said plunger having a pair of channels in said shoulder for receiving said ribs, the diametric distance between said ribs corresponding to the diameter of said plunger member.

5. A cord clamp according to claim 1 wherein said rib and said channel are of a substantially common height and depth respectively.

6. A cord clamp according to claim 5 wherein said bore intersects said shoulder, and the outer surfaces of said rib and said lip are formed as a continuous surface.

7. A cord clamp according to claim 1 wherein an end of said sleeve opposite said one end has a surrounding shoulder including an upstanding rim, said cap member having a groove adapted for receiving said rim in frictionally secured engagement.

8. A cord clamp according to claim 1 wherein said bias means is a compression spring positioned between said first end portion of said plunger and said cap, and said cap including a raised portion on its interior surface adapted for frictionally mounting said spring to said cap.

9. A cord clamp according to claim 1 wherein said cap and said sleeve are permanently affixed to one another.

10. A cord clamp adapted for binding a flexible cord and the like, comprising:
    a cylindrical sleeve having a pair of diametrically opposed holes in the sidewall thereof and a circumferential shoulder on a portion of a first end projecting radially inwardly of said sleeve in surrounding relation thereto;
    a cylindrical plunger member having a first end portion positioned in the interior of said sleeve and a second end portion positioned exteriorly of said sleeve, said sleeve and plunger member being axially movable with respect to one another between first and second positions, said plunger member having a shoulder member projecting radially outwardly on said first end portion in surrounding relation thereto;

an axial rib on one of said sleeve and said plunger member positioned on a surface of the sidewall thereof in facing relationship to the other of said sleeve and said plunger member, and a channel formed in the shoulder of the other of said sleeve and said plunger member for receiving said rib to prevent relative rotational movement while permitting relative axial movement of said sleeve and said plunger member, said plunger member having a bore therethrough positioned for registering in alignment with said holes when said plunger member and sleeve are in said first position, said bore being in axially spaced-apart relation to said holes when said plunger member and sleeve are in second position, said rib and said channel being in circumferentially offset relation to said bore and said holes, and said shoulders positioned to abut one another around the circumference of said plunger member and said sleeve in a plane normal to the common axis thereof to prevent separation of said plunger member and said sleeve;

a cap member enclosing a second end of said sleeve; and bias means associated with said sleeve and said plunger member for urging them axially into said second position.

11. A cord clamp according to claim 10 wherein said rib is formed as a continuation of the shoulder on its respective one of said sleeve and said plunger members in an axial direction.

12. A cord clamp according to claim 10 wherein the shoulder of said plunger member has diametrically opposed portions adjacent said bore, said bore being of circular cross-section and partially intersecting said diametrically opposed portions of said shoulder.

13. A cord clamp according to claim 10 wherein said plunger member is hollow, said bore being defined by a pair of diametrically opposed holes in the sidewall of said plunger member.

* * * * *

UNITED STATES PATENT AND TRADEMARK OFFICE
CERTIFICATE OF CORRECTION

PATENT NO. : 4,328,605

DATED : May 11, 1982

INVENTOR(S) : HUTCHISON, V. James and ROBB, Wayne F.

It is certified that error appears in the above—identified patent and that said Letters Patent is hereby corrected as shown below:

Column 3, line 32, after "manufacture." insert as a new paragraph.

--A radially inwardly projecting shoulder or lip 28 is formed on one end of sleeve 14 so that it completely surrounds the circumference of sleeve 14 to define an opening 29 of reduced cross-sectional area with respect to the cross-section of sleeve 14. A pair of diametrically opposed ribs 30 are formed on the interior surface of the surrounding sidewall 32 of sleeve 14. Ribs 30 extend in an axial or longitudinal direction on the interior surface of sidewall 32 and are joined at one end to lip 28. The exposed surface 34 of rib 30 and the inner surface 36 of lip 28 are coextensive in a common cylinder of somewhat reduced diameter with respect to the diameter of sleeve 14--

Signed and Sealed this

Thirtieth Day of November 1982

[SEAL]

Attest:

Attesting Officer

GERALD J. MOSSINGHOFF

Commissioner of Patents and Trademarks